(12) United States Patent
Chen

(10) Patent No.: US 9,069,187 B2
(45) Date of Patent: Jun. 30, 2015

(54) PHOTOCHROMIC SPECTACLES

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/036,144

(22) Filed: Sep. 25, 2013

(65) Prior Publication Data

US 2015/0022776 A1 Jan. 22, 2015

(30) Foreign Application Priority Data

Jul. 19, 2013 (TW) .............................. 102126022 U

(51) Int. Cl.
*G02C 3/00* (2006.01)
*G02C 7/10* (2006.01)

(52) U.S. Cl.
CPC . *G02C 7/102* (2013.01); *G02C 7/10* (2013.01)

(58) Field of Classification Search
CPC .............. G02B 5/23; G02C 7/10; G02C 7/02; G02C 7/12; G02C 7/04; G02C 7/08; G02C 7/083; A61F 2/145
USPC ............... 351/159.01, 159.39, 159.49, 159.6, 351/159.65, 159.61, 159.73
See application file for complete search history.

(56) References Cited

U.S. PATENT DOCUMENTS 5,377,037 A * 12/1994 Branz et al. ................... 359/265

* cited by examiner

*Primary Examiner* — James Greece
(74) *Attorney, Agent, or Firm* — Novak Druce Connolly Bove + Quigg LLP

(57) ABSTRACT

Photochromic spectacles which use solar energy as the power source include a frame, two lenses arranged in the frame, and a driving circuit. Each lens includes a substrate, an electrochromic film and a solar cell film. The solar cell is a transparent and outer film and absorbs infrared light and ultraviolet light from the sun, to convert the infrared and ultraviolet light to electrical power. The driving circuit is arranged on the frame and electrically connected with the electrochromic film and the solar cell, the driving circuit can be switched to apply or not to apply electrical power generated by the solar cell film to the electrochromic film to darken the spectacles.

12 Claims, 5 Drawing Sheets

PHOTOCHROMIC SPECTACLES

BACKGROUND

1. Technical Field

The present disclosure relates to photochromic spectacles powered by solar cell films thereof.

2. Description of Related Art

Photochromic spectacles are used for protecting the wearer's eyes against unwanted external light stimulation. However, typical photochromic spectacles need additional batteries to provide power, and this makes the photochromic spectacles bulky.

Therefore, it is desired to provide photochromic spectacles which can overcome the above mentioned problems.

DETAILED DESCRIPTION

Figure 1:
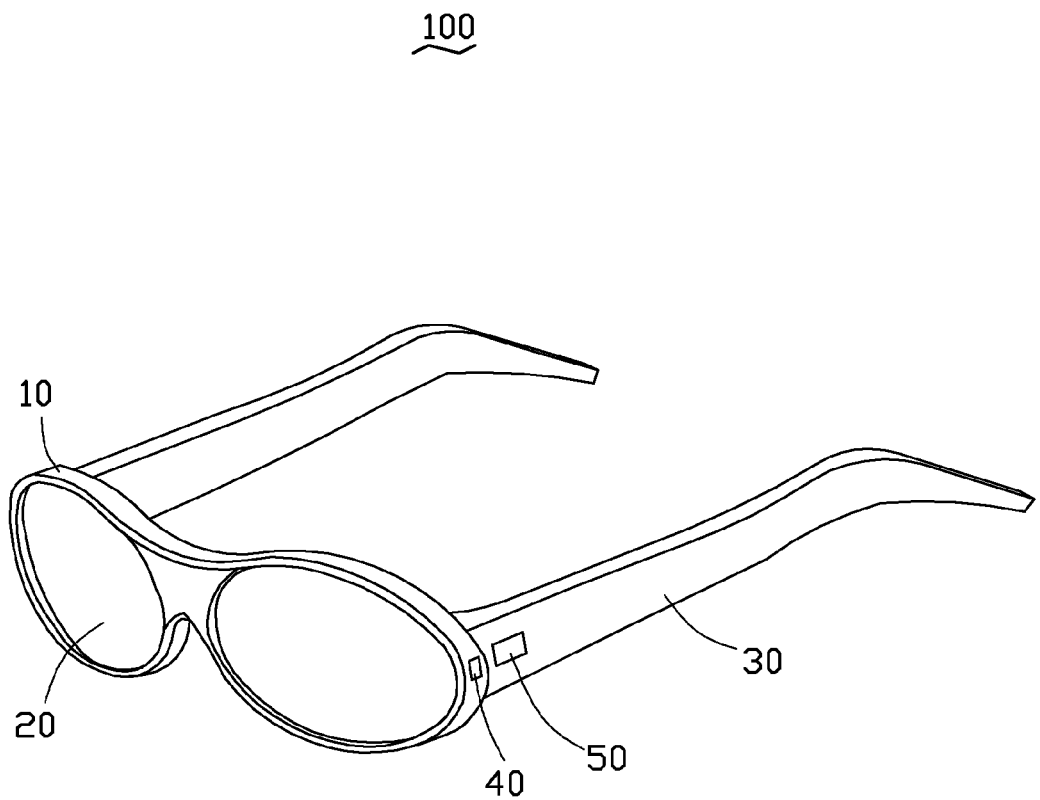
FIG. 1 is an isometric view of photochromic spectacles including a pair of lenses, according to a first embodiment.
Figure 2:
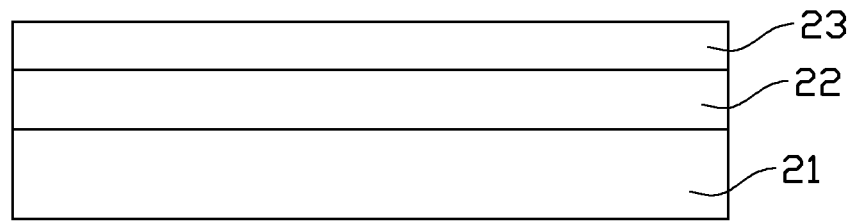
FIG. 2 is an enlarged, schematic cross-sectional view of one lens of FIG. 1, the lens including an electrochromic film.
Figure 3:
FIG. 3 is a schematic cross-sectional view of the electrochromic film of FIG. 2.

FIGS. 1-3 show photochromic spectacles 100 according to a first embodiment. The photochromic spectacles 100 are battery-free, and include a frame 10, two lenses 20 arranged in the frame 10, two arms 30, a driving circuit 40 and a control switch 50.

The lenses 20 each have a flat or curved surface, and can be vision corrective lenses or non-corrective lenses. Each lens 20 includes a substrate 21, an electrochromic film 22, and a solar cell film 23. The substrate 21 is made of resin. In this embodiment, the electrochromic film 22 is sandwiched between the solar cell film 23 and the substrate 21.

Referring to FIG. 3, the electrochromic film 22 includes a first transparent conductive layer 221, an ion storage layer 222 for providing positive ions, an electrolyte layer 223, an electrochromic layer 224 and a second transparent conductive layer 225 layered in that sequence. The first transparent conductive layer 221 and the second transparent conductive layer 225 are made of transparent conductive glass, such as indium tin oxide. The ion storage layer 222 is a lithium metal layer for providing lithium ions. The electrolyte layer 223 transmits the positive ions provided by the ion storage layer 222, for example, $H^+$, $Li^+$, or $Na^+$. The electrolyte in the electrolyte layer 223 is $LiClO_4$ or $LiBF_4$, in one example. The electrochromic layer 224 may be made of organic electrochromic material or inorganic electrochromic material. The organic electrochromic material can be selected from organic low molecular compound or organic polymer, such as polyaniline, viologen, phenazine, or the like. The inorganic electrochromic layer can be made of tungsten trioxide ($WO_3$) or a metal oxide. In this embodiment, the electrochromic layer 224 is made of $WO_3$. If the electrochromic layer 224 is made of organic electrochromic material, the speed of chemical reaction is fast and the transition state is also fast accordingly.

The solar cell film 23 is a transparent film and arranged as an outer layer of the lenses 20. The thickness of the solar cell film 23 is typically about 5 μm~150 μm. The outer layer can be understood as the layer farthest from the wearer's eye when the spectacles are worn. The solar cell film 23 is configured for absorbing infrared light and ultraviolet light, and converting the infrared and ultraviolet light into electrical power. A size of a major face of the solar cell film 23 is substantially equal to a corresponding size of the substrate 21. The solar cell film 23 is a dye-sensitized solar cell or a photosensitive plastic polymer battery. The dye-sensitized solar cell includes a transparent conductive glass, a color dye, and an electrolyte formed between the transparent conductive glass and the color dye. A light transmission rate of the dye sensitized solar cell is determined by a color of the color dye and a color of the electrolyte.

Because the solar cell film 23 is arranged as the outer layer of the lens 20, the solar cell film 23 absorbs more sunlight to generate the needed power, and also helps prevent an excessive amount of ultraviolet light reaching the wearer's eye.

Figure 5:
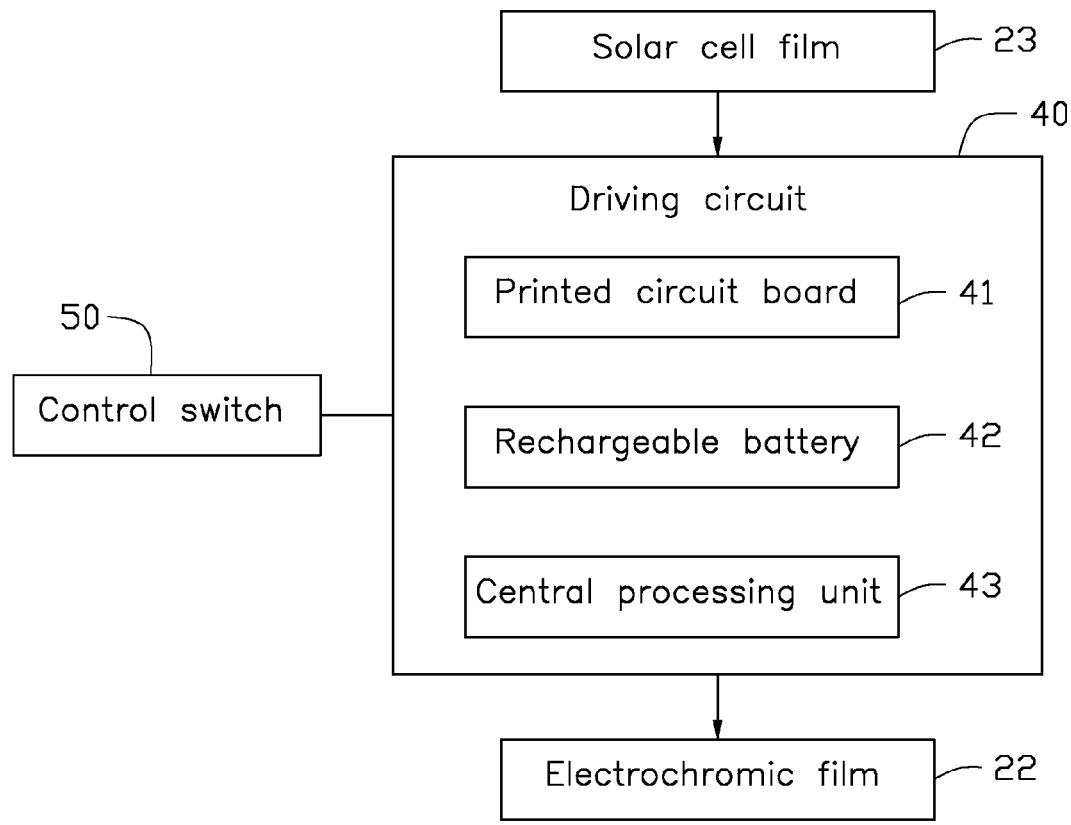
FIG. 5 is a functional block of the photochromic spectacles of FIG. 1.

The driving circuit 40 is arranged on the frame 10 and electrically connected with the electrochromic film 22 and the solar cell 23, as shown in FIG.5. The driving circuit 40 includes a printed circuit board (PCB) 41, a rechargeable battery 42, and a central processing unit (CPU) chip 43. The battery 42 and the CPU chip 43 are both arranged on the printed circuit board 41. The battery 42 is used for storing the electric power generated by the solar cell film 23. The driving circuit 40 is configured for providing the electric power generated by the solar cell film 23 to the electrochromic film 22. The two arms 30 are connected with the frame 10. The control switch 50 is arranged on one of the arms 30 and configured for switching the driving circuit 40 to provide or not provide power to the electrochromic film 22.

The photochromic spectacles 100 are transparent indoors. When the photochromic spectacles 100 are used outdoors under strong sunlight, the solar cell film 23 absorbs the infrared light and the ultraviolet light from the sun, converts the light energy to electrical power, and stores the power in the battery. When a predetermined voltage difference is applied between the first transparent conductive layer 221 and the second transparent conductive layer 225, the electrochromic film 22 gradually darkens and in this way the wearer's eyes are protected from ultraviolet light. Typically, the change from the transparent state to the dark state takes about ten seconds. When the voltage polarity is reversed, the electrochromic film 22 changes from dark to transparent. Thus, the color or translucency of the electrochromic film 22 can be changed between transparent and dark, and this realizes the function of a desired discoloration of the photochromic spectacles 100.

Figure 4:
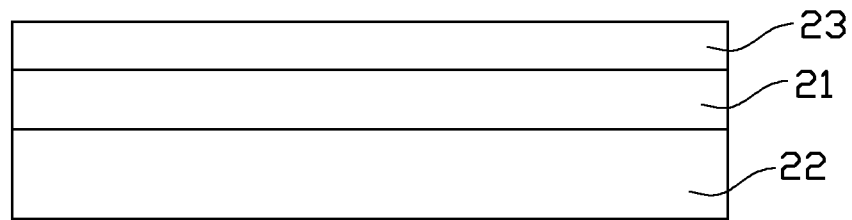
FIG. 4 is a schematic cross-sectional view of one lens of photochromic spectacles according to a second embodiment.

Referring to FIG. 4, a lens 201 of photochromic spectacles according to a second embodiment also includes a substrate 21, a solar cell film 23 and an electrochromic film 22. The substrate 21 is sandwiched between the solar cell film 23 and the electrochromic film 22. The photochromic spectacles of the second embodiment having two of the lenses 201 are similar to the photochromic spectacles 100 of the first embodiment.

It is to be understood that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A photochromic spectacles comprising:
a frame;
two lenses arranged in the frame; each of the lenses comprising a substrate, an electrochromic film and a solar cell film, the substrate sandwiched between the solar cell film and the electrochromic film, the solar cell film being transparent and located at an outer side of the lens, the solar cell film being the layer farthest from the eye side of the spectacles, the solar cell film configured for absorbing infrared light and ultraviolet light from the sun, and converting the infrared and ultraviolet light to power;
a driving circuit arranged on the frame, the driving circuit comprising a printed circuit board, a rechargeable battery, and a central processing unit chip, the rechargeable battery and the central processing unit chip both being arranged on the printed circuit board, the rechargeable battery being used for storing the electric power generated by the solar cell film, the driving circuit electrically connected with the electrochromic film and the solar cell film, and the driving circuit configured for applying the electric power generated by the solar cell film to the electrochromic film; and
a control switch and two arms connected with the frame, wherein the control switch is arranged on one of the arms and is configured for controlling the driving circuit to provide the electric power to the electrochromic film.

2. The photochromic spectacles of claim 1, wherein the electrochromic film comprises a first transparent conductive layer, an ion storage layer for providing positive ions, an electrolyte layer, an electrochromic layer and a second transparent conductive layer layered in that sequence.

3. The photochromic spectacles of claim 2, wherein the first transparent conductive layer and the second transparent conductive layer are made of transparent conductive glass.

4. The photochromic spectacles of claim 3, wherein the transparent conductive glass comprises indium tin oxide.

5. The photochromic spectacles of claim 2, wherein the ion storage layer is a lithium metal layer for providing lithium ions.

6. The photochromic spectacles of claim 2, wherein the electrochromic layer is made of one of organic electrochromic material and inorganic electrochromic material.

7. The photochromic spectacles of claim 6, wherein the electrochromic layer is made of organic electrochromic material, and the organic electrochromic material is polyaniline.

8. The photochromic spectacles of claim 6, wherein the electrochromic layer is made of inorganic electrochromic material, and the inorganic electrochromic material is tungsten trioxide ($WO_3$).

9. The photochromic spectacles of claim 1, wherein the substrate is made of resin.

10. The photochromic spectacles of claim 1, wherein a size of a major face of the solar cell film is equal to a corresponding size of the substrate.

11. The photochromic spectacles of claim 1, wherein the lens has one of a flat surface and a curved surface.

12. A photochromic spectacles comprising:
a frame;
two lenses arranged in the frame;
each of the lenses comprising a substrate, an electrochromic film and a solar cell film, the electrochromic film sandwiched between the solar cell film and the substrate, the solar cell film being transparent and located at an outer side of the lens, the solar cell film being the layer farthest from the eye side of the spectacles, the solar cell film is one of a dye-sensitized solar cell and a photosensitive plastic polymer battery and configured for absorbing infrared light and ultraviolet light from the sun, and converting the infrared and ultraviolet light to power; and
a driving circuit arranged on the frame, the driving circuit comprising a printed circuit board, a rechargeable battery, and a central processing unit chip, the battery and the central processing unit chip both being arranged on the printed circuit board, the battery being used for storing the electric power generated by the solar cell film, the driving circuit electrically connected with the electrochromic film and the solar cell film, and the driving circuit configured for applying the power generated by the solar cell film to the electrochromic film; and
a control switch and two arms connected with the frame, wherein the control switch is arranged on one of the arms and is configured for controlling the driving circuit to provide the electric power to the electrochromic film.

* * * * *